(12) United States Patent
Liu

(10) Patent No.: US 11,443,627 B2
(45) Date of Patent: Sep. 13, 2022

(54) NAVIGATION SYSTEM WITH PARKING SPACE IDENTIFICATION MECHANISM AND METHOD OF OPERATION THEREOF

(71) Applicant: TeleNav, Inc., Santa Clara, CA (US)

(72) Inventor: Weizhe Liu, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 17/132,353

(22) Filed: Dec. 23, 2020

(65) Prior Publication Data

US 2022/0198928 A1 Jun. 23, 2022

(51) Int. Cl.
| | |
|---|---|
| *G08G 1/14* | (2006.01) |
| *G09G 5/37* | (2006.01) |
| *G06N 3/08* | (2006.01) |
| *G06N 3/04* | (2006.01) |
| *G06V 20/58* | (2022.01) |

(52) U.S. Cl.
CPC .............. *G08G 1/143* (2013.01); *G06N 3/04* (2013.01); *G06N 3/08* (2013.01); *G06V 20/586* (2022.01); *G09G 5/37* (2013.01); *G09G 2354/00* (2013.01); *G09G 2380/10* (2013.01)

(58) Field of Classification Search
CPC ........ G08G 1/143; G06V 20/586; G06N 3/04; G06N 3/08; G09G 5/37
USPC ......................................................... 340/932
See application file for complete search history.

(56) References Cited

U.S. PATENT DOCUMENTS

| | | | |
|---|---|---|---|
| 9,363,483 | B2 | 6/2016 | Bulan et al. |
| 10,078,789 | B2 | 9/2018 | Gupta et al. |
| 10,311,731 | B1 | 6/2019 | Li et al. |
| 2005/0033495 | A1 | 2/2005 | Tanaka et al. |
| 2014/0375804 | A1 | 12/2014 | Bulan et al. |
| 2017/0017848 | A1 | 1/2017 | Gupta et al. |
| 2020/0089974 | A1 | 3/2020 | Ding et al. |
| 2020/0090504 | A1* | 3/2020 | Kadar .................. G08G 1/0129 |
| 2020/0090516 | A1 | 3/2020 | Sert et al. |
| 2020/0200548 | A1* | 6/2020 | Chawla ................ G06N 3/0454 |
| 2020/0210696 | A1* | 7/2020 | Hou .................... G06V 10/7515 |
| 2020/0286382 | A1* | 9/2020 | Avedisov ................ G08G 1/16 |

(Continued)

FOREIGN PATENT DOCUMENTS

CN  111259710 A  6/2020

*Primary Examiner* — Kerri L McNally
(74) *Attorney, Agent, or Firm* — Perspectives Law Group, Corp.

(57) ABSTRACT

A navigation system includes: a user interface configured to: receive a sensor data packet for a scan area; a control circuit, coupled to the user interface, configured to: analyze the sensor data packet submitted to a multilayer neural network already trained including storing the sensor data packet; parse the sensor data packet with the multilayer neural network to generate real world endpoints and a bounding box including identifying the real world coordinates; apply line rules, including identifying a parking space by the real world endpoints including storing the real world endpoints in the storage circuit; compile an overhead depiction including boundary lines of the parking space identified by the real world endpoints and the bounding box in the scan area; merge vehicle maneuvering instructions into the overhead depiction for accessing the parking space; and present the overhead depiction for displaying on a user display.

20 Claims, 8 Drawing Sheets

(56) References Cited

U.S. PATENT DOCUMENTS

2020/0294310 A1 9/2020 Lee et al.
2020/0334985 A1 10/2020 Zhou et al.

* cited by examiner

NAVIGATION SYSTEM WITH PARKING SPACE IDENTIFICATION MECHANISM AND METHOD OF OPERATION THEREOF

TECHNICAL FIELD

An embodiment of the present invention relates generally to a navigation system, and more particularly to a system with a parking space identification mechanism.

BACKGROUND ART

The rise of autonomous self-driving vehicles along with non-autonomous or semi-autonomous vehicles requires additional details to perform parking operations. The requirements of driver assisted or fully automated parking include clearly discernable boundaries in all lighting conditions. Research and development in the existing technologies can take a myriad of different directions.

As driver assisted and autonomous vehicles take to the road, the lack of accurate parking space detection and definition can compromise the ability of these vehicles to operate properly. Since the vehicles attempt to center the parking position in the available parking space, it is essential that appropriate detection of the space boundaries be performed. Also, a problem of misidentified parking spaces can lead to parking violations that the vehicle owner can be liable for have been known to occur.

Thus, a need still remains for a navigation system with a parking space identification mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: receiving a sensor data packet for a scan area; analyzing the sensor data packet submitted to a multilayer neural network already trained including storing the sensor data packet; parsing the sensor data packet with the multilayer neural network to generate real world endpoints and a bounding box including identifying the real world coordinates; applying line rules, including identifying a parking space by the real world endpoints including storing the real world endpoints in the storage circuit; compiling an overhead depiction including boundary lines of the parking space identified by the real world endpoints and the bounding box in the scan area; merging vehicle maneuvering instructions into the overhead depiction for accessing the parking space; and presenting the overhead depiction for displaying on a user display.

An embodiment of the present invention provides a navigation system, including a user interface configured to: receive a sensor data packet for a scan area; a control circuit, coupled to the user interface, configured to: analyze the sensor data packet submitted to a multilayer neural network already trained including storing the sensor data packet; parse the sensor data packet with the multilayer neural network to generate real world endpoints and a bounding box including identifying the real world coordinates; apply line rules, including identifying a parking space by the real world endpoints including storing the real world endpoints in the storage circuit; compile an overhead depiction including boundary lines of the parking space identified by the real world endpoints and the bounding box in the scan area; merge vehicle maneuvering instructions into the overhead depiction for accessing the parking space; and transmit the overhead depiction for displaying on a user display.

An embodiment of the present invention provides a non-transitory computer readable medium including instructions for a navigation system, including: receiving a sensor data packet for a scan area; analyzing the sensor data packet submitted to a multilayer neural network already trained including storing the sensor data packet; parsing the sensor data packet with the multilayer neural network to generate real world endpoints and a bounding box including identifying the real world coordinates; applying line rules, including identifying a parking space by the real world endpoints including storing the real world endpoints in the storage circuit; compiling an overhead depiction including boundary lines of the parking space identified by the real world endpoints and the bounding box in the scan area; merging vehicle maneuvering instructions into the overhead depiction for accessing the parking space; and presenting the overhead depiction for displaying on a user display.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
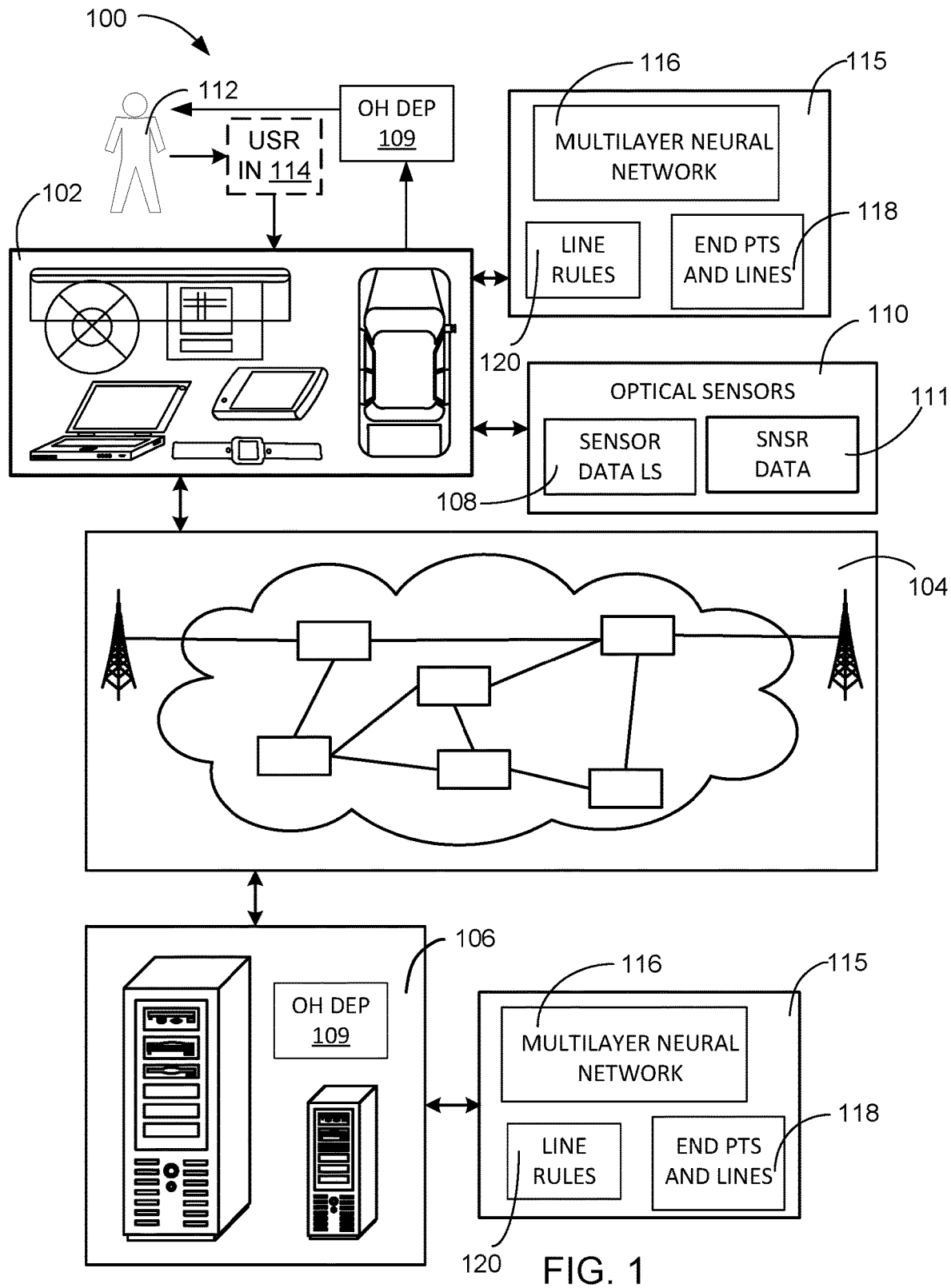
FIG. 1 is a navigation system with a parking space identification mechanism in an embodiment of the present invention.

The following embodiments can accurately identify parking spaces under most lighting conditions, which enables vehicle movement control for operating or controlling physical movement of a vehicle. The vehicle movement control can be based on a driver assisted or an autonomous vehicle parking process that is safe and reliable due to the accuracy of the line detection.

The vehicle movement control can further be based on accurately identifying the type of parking space under various lighting conditions in order to assure the driver assisted or autonomous vehicle can be completed without risk of damage to the vehicle or any adjacent objects or property.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a vehicle.

The term "module" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also for example, the hardware can be gates, circuitry, processor, computer, integrated circuit, integrated circuit cores, memory devices. a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a navigation system 100 with a parking space location mechanism in an embodiment of the present invention. The navigation system 100 can include a first device 102, such as a client or a server, connected to a second device 106, such as a client or server.

The navigation system 100 can include a system for searching or providing guidance or information associated with geographic locations, speed control, a regulatory system for enabling access to a device or a vehicle, or a combination thereof. The first device 102 can communicate with the second device 106 through a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional device. Also, for example, the first device 102 can include a device or a sub-system, an autonomous or self-maneuvering vehicle or object, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, or motorcycle.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or high definition video processing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a motorcycle.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as endpoints of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can provide additional features that are not available in prior art navigation systems. The first device 102 can be coupled to optical sensors 110 and a sensor data local storage 108. The optical sensors 110 are sensors, such as a set of monocular cameras positioned on the first device 102, configured to monitor, observe, record, or a combination thereof the surroundings of the first device 102. The sensor data local storage 108 provides a non-transitory storage medium.

For example, the sensor data local storage 108 can be implemented in a number of ways, such as a non-volatile storage device, such as a hard disk drive, a solid state storage device (SSD), a FLASH memory card, or a combination thereof.

The first device 102 can be coupled to an object detection module 115, such as a pixel evaluation module, that can be implemented in software running of specialized hardware, full hardware, or a combination thereof configured to analyze a photographic scene to determine both bounding boxes and line endpoints of a captured scene. The object detection module 115 can parse a sensor data packet 111 in order to establish both the bounding boxes and endpoints for the scene captured by the optical sensors 110. For parking space detection, the network transmission is optional. During the training process, the first device 102 can upload of the sensor data packet 111 to the second device 106 for further analysis or to generate an updated version of the multilayer neural network 116 to improve the detection of a parking space (not shown).

The object detection module 115 can include a multilayer neural network 116, an endpoints and lines module 118, and a line rules module 120 that can generate coordinates for construction of the overhead depiction 109. The multilayer neural network 116 can be a software or hardware module capable of performing matrix mathematics on the input pixels of the scan data within the sensor data packet 111 in order to identify the bounding boxes and endpoints of lines forming a parking space and other markings.

The endpoints and lines module 118 can be software or hardware module capable of determining the presence of lines based on the bounding boxes and the endpoints generated by the multilayer neural network 116, which can be stored in the first device 102 or the second device 106. The endpoints and lines module 118 can receive input from the line rules module 120, which provides the guiding parameters for identifying the different types of the parking space that is represented in the sensor data packet 111. The sensor data packet 111 can be analyzed by submitting the scan data portion of the sensor data packet 111 to the multilayer neural network 116. It is understood that other portions of the sensor data packet 111 including time, real world position, and extrinsic parameters of the optical sensor 110 can be stored in the first device 102 or the second device 106 for subsequent operations.

The line rules module 120 can be an updatable set of parameters for identifying the parking space, including line length, line spacing, placard identification, and parking orientation, to differentiate pull-in or parallel parking spaces, handicapped parking space, motorcycle parking space, or prohibited parking space, such as an emergency vehicle parking area. The results of the analysis of the line rules module 118 can be stored in the storage circuitry of the first device 102 or the second device 106.

The endpoints and lines module 118 can output the overhead depiction 109 including a reference designator provided by the first device 102 indicating whether the identified parking space is suitable for the first device 102. If the parking space is suitable for the first device 102, the control guidance instructions can be generated with the overhead depiction 109 to autonomously park or assist in parking the first device 102.

The sensor data local storage 108 can be coupled to the optical sensors 110 in order to store a sensor data packet 111 and an overhead depiction 109 returned from the second device 106. The first device 102 can assemble parameters for the optical sensors 110, scan data, time, real world coordinates, and extrinsic parameters of the optical sensor 110 to generate the sensor data packet 111 for analysis. The sensor data packet 111 can provide the information captured by the optical sensors 110, a time and location, as the real world coordinates, and extrinsic parameters of the optical sensor 110, for the information that was captured by the optical sensors 110 and recorded in the sensor data local storage 108.

The navigation system 100 can be operated by a user 112. The user 112 can include a person or an entity accessing or utilizing the navigation system 100 or a device therein. For example, the user 112 can include a person owning or operating the first device 102, a service, or a combination thereof. Also, for example, the user 112 can access or utilize the second device 106 through the first device 102, a service, or a combination thereof.

The navigation system 100 can further process a direct user input 114 from the user 112. The direct user input 114 can include a request for navigation assistance, location of a point of interest, parking assistance, restaurant assistance, lodging assistance, location of gas stations, event reservations, or a combination thereof. The direct user input 114 can be provided by or from the user 112 directly to or directly on the first device 102. The direct user input 114 can include the input or the stimulus directly for or related to corresponding software, application, feature, or a combination thereof.

The navigation system 100 can implement one or more embodiments without the direct user input 114. The navigation system 100 can further implement one or more embodiments using the direct user input 114 unrelated thereto, previous instances of the direct user input 114, or a combination thereof. Further details are discussed below.

The second device 106 can receive the sensor data packet 111 from the first device 102 when requesting service in identifying a parking space (not shown). The second device 106 can parse the sensor data packet 111, identifying the extrinsic parameters of the optical sensors 110, the real world coordinates of the optical sensor 110, the time, and the scan data, in order to produce the overhead depiction 109. The overhead depiction 109 is a top down view of the space identified in the sensor data packet 111. The overhead depiction 109 can also include an indication of suitability and orientation for the first device 102. By way of an example the overhead depiction can identify the sensor data packet 111 as indicating a motorcycle parking space, a handicapped parking space, a compact vehicle parking space, or an over-sized vehicle parking space.

The second device 106 can analyze the sensor data packet 111 in order to produce the overhead depiction 109 and refinements to the multilayer neural network 116 for use by the first device 102 during a training process. By way of an example, the second device 106 can verify the sensor data packet 111 by checking the time and location information in order to identify that it represents a region including a parking space suitable for the first device 102.

The second device 106 can be coupled to an object detection module 115, such as the pixel evaluation module, that can be implemented in software running of specialized hardware, full hardware, or a combination thereof configured to analyze a photographic scene to determine both bounding boxes and line endpoints of a captured scene. The object detection module 115 can parse the sensor data packet 111 in order to establish both the bounding boxes and endpoints for the scene captured by the optical sensors 110.

The object detection module 115 can include the multilayer neural network 116, the endpoints and lines module 118, and the line rules module 120 that can generate coordinates for construction of the overhead depiction 109. The multilayer neural network 116 can be a software or hardware module capable of performing matrix mathematics on the input pixels of the scan data within the sensor data packet 111 in order to identify the bounding boxes and endpoints of lines forming a parking space and other markings.

The endpoints and lines module 118 can be software or hardware module capable of determining the position of lines based on the bounding boxes and the endpoints generated by the multilayer neural network 116, which can be stored in the second device 106. The endpoints and lines module 118 can receive input from the line rules module 120, which provides the guiding parameters for identifying the different types of the parking space that is represented in the sensor data packet 111. The sensor data packet can be analyzed by submitting the scan data portion of the sensor data packet 111 to the multilayer neural network 116. It is understood that other portions of the sensor data packet 111 including time, real world position, and extrinsic parameters of the optical sensor 110 can be stored in the second device 106 for subsequent operations.

The line rules module 120 can be an updatable set of parameters for identifying the parking space, including line length, line spacing, placard identification, and parking orientation, to differentiate pull-in or parallel parking spaces, handicapped parking space, motorcycle parking space, or prohibited parking space. The results of the analysis of the line rules module can be stored in the storage circuitry of the second device 106.

The endpoints and lines module 118 can output the overhead depiction 109 including a reference designator provided by the first device 102 or the second device 106 indicating whether the identified parking space is suitable for the first device 102. If the parking space is suitable for the first device 102, the second device 106 can include control guidance instructions in the overhead depiction 109 to autonomously park or assist in parking the first device 102.

It has been discovered that the navigation system 100 can reliably identify suitable parking spaces for the first device 102 by capturing the scene as depicted by the optical sensors 110 and applying the object detection module 115 in order to identify the type of parking space that was captured by the optical sensors 110. The first device 102 can verify that the identified parking space is suitable for the first device 102 and provide control instructions as part of the overhead depiction 109. During a training process, the first device 102 can transfer the scene as depicted by the optical sensors 110, compiling the sensor data packet 111, and sending it to the second device 106 for training the multilayer neural network 116 and refining the line rules 120.

Figure 2:
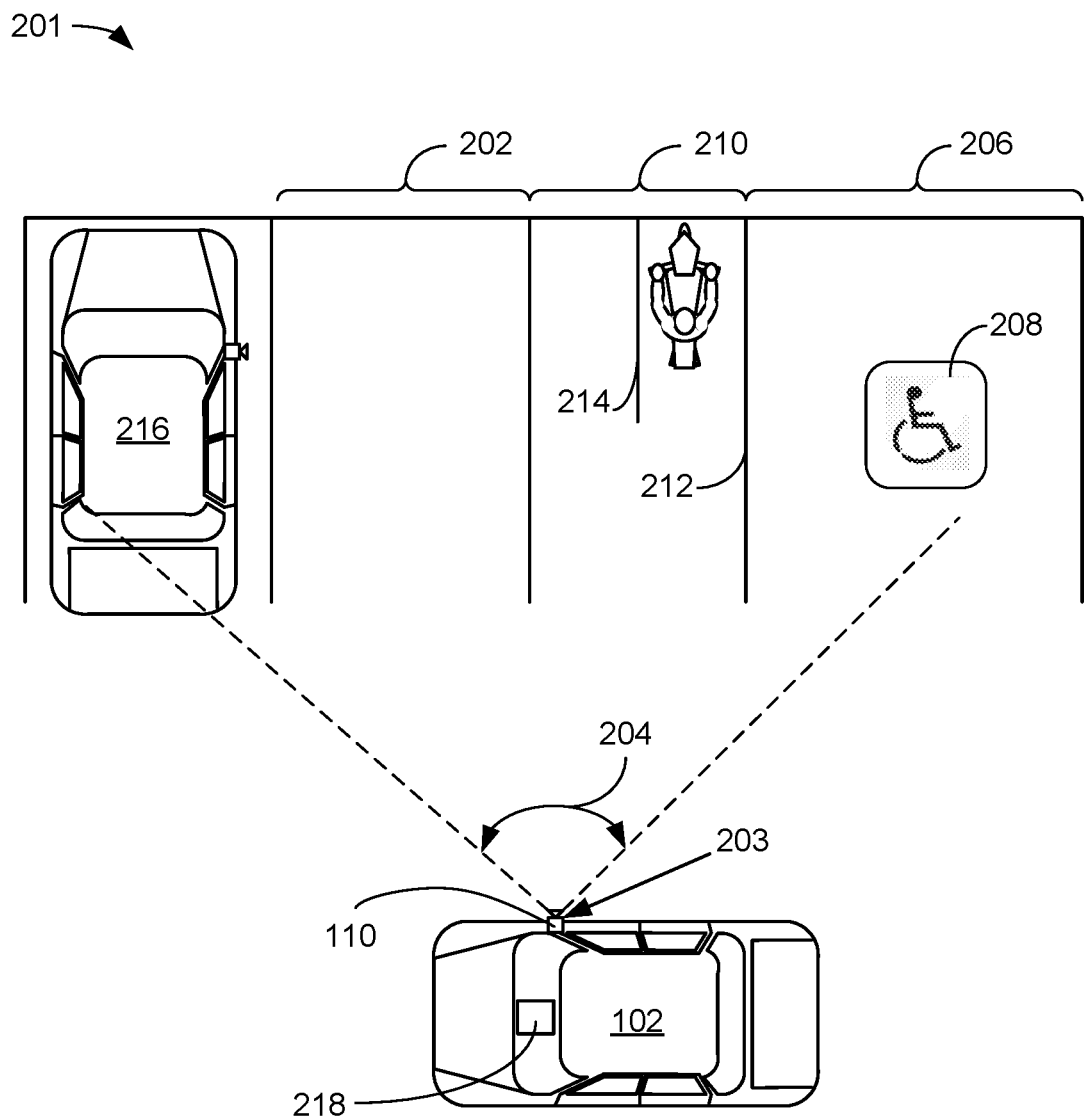
FIG. 2 is an example of a top view of a parking lot scan performed by the navigation system.

Referring now to FIG. 2, therein is shown an example of a top view of a parking lot scan 201 performed by the navigation system 100 of FIG. 1. The parking lot scan 201 of the navigation system 100 depicts the first device 102 in search of a parking space 202. The first device can be an autonomous vehicle or a parking assisted vehicle.

The first device 102 is an object or a machine used for transporting people or goods capable of automatically maneuvering or operating the object or the machine. The first device 102 can include vehicles accessible by the user 112 of FIG. 1 for control, maneuver, operation, or a combination thereof. For example, the first device 102 can include any of a car, a truck, a cart, or a motorcycle.

The first device 102 can further be controlled or maneuvered without the direct user input 114 of FIG. 1 corresponding to the maneuver or the movement. For example, the first device 102 can be an autonomous vehicle including a self-driving vehicle, or a vehicle with automatic maneuvering features, such as smart cruise control or preventative breaking. The first device 102 can include automated parking system for identifying and accessing the parking space 202 without the direct user input 114. Also, for example, the first device 102 can be controlled or maneuvered by the navigation system 100, including the navigation system 100 controlling physical maneuvers or movements of the first device 102.

The first device 102 can identify real world coordinates 203 of the optical sensor 110 by a GPS reading or cell tower triangulation. The first device 102 can include the optical sensor 110 for scanning a scan area 204 in search of the parking space 202. It is understood that the scan area 204 can include a handicapped parking space 206, identified by a placard 208, a motorcycle parking space 210, or an occupied parking space 216. The scan area 204 is defined as the area limited by the viewing angle of the optical sensor 110. The scan area 204 can be displayed on a user display 218, such as a Liquid Crystal Display (LCD) or a Thin Film Transistor (TFT) display.

The handicapped parking space 206 can be an area reserved for the user 112 of FIG. 1 that is physically impaired and can be identified by the placard 208 at its center. If the first device 102 is configured as a transport vehicle for the user 112 that is physically impaired, the handicapped parking space 206 would be a viable place to park the first device 102. The motorcycle parking space 210 is identified by the boundary lines 212 in closer proximity than those of the parking space 202 and a MC divider line 214 between the boundary lines 212. The occupied parking space 216 can be identified by the presence of a parked vehicle blocking one of the boundary lines 212. The availability of the parking space 202 can be determined by the presence of two of the boundary lines 212 with no intervening lines or the placard 208 between them.

The first device 102 can compile a scan of the scan area 204, the real world coordinates 203 of the optical sensor 110, and the extrinsic parameters of the optical sensor 110. The first device 102 can use the object detection module 115 of FIG. 1 to begin the process of identifying the parking space 202 for the autonomous vehicle or parking assist function of the first device 102, It has been discovered that the navigation system 100 can differentiate the parking space 202, the handicapped parking space 206, the motorcycle parking space 210 and the occupied parking space 216 by analyzing the boundary lines 212 and anything that is found between them in various lighting situations in the scan area 204. By analyzing the boundary lines 212 and applying a predefined set of rules to them, the availability of the parking space 202 can be confirmed reliably independent of line colors and ambient lighting conditions.

Figure 3:
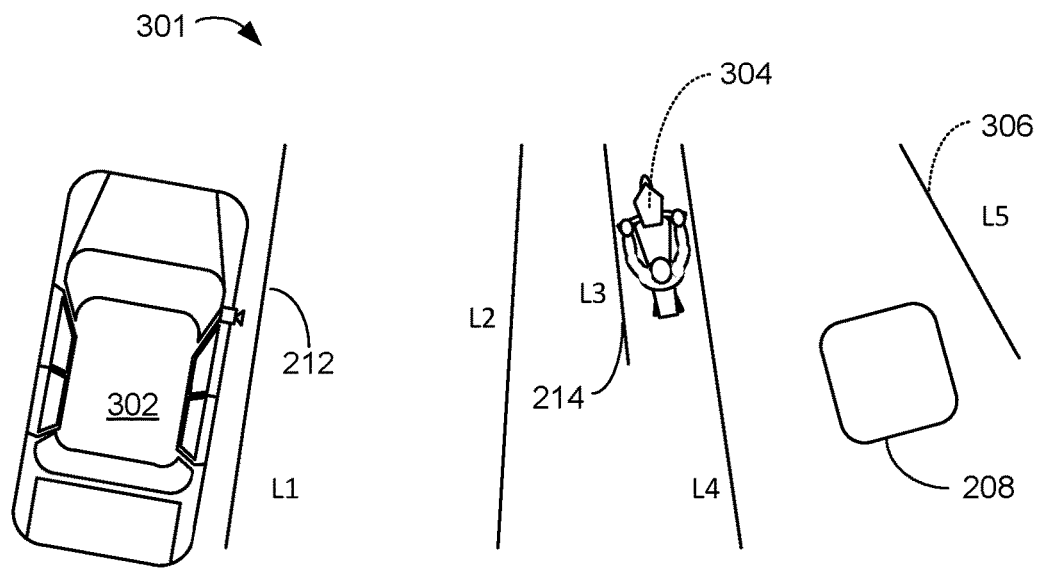
FIG. 3 is an exemplary line diagram of a line rendering of the parking lot scan of FIG. 2 as processed by the navigation system.

Referring now to FIG. 3, therein is shown an exemplary line diagram of a line rendering 301 of the parking lot scan 201 of FIG. 2 as processed by the navigation system 100. The line rendering 301 can depict the boundary line 212 as viewed through the lens of the optical sensor 110 of FIG. 1. The optical sensor 110 can be a monocular camera including a wide-angle lens. The distortion caused by the lens can make the boundary lines 212 seem to converge at a distant point.

A parked vehicle 302 can be located adjacent to the boundary line 212 designated as L1 and a motorcycle 304 can be located between the boundary line 212 designated as L4 and the MC divider line 214 designated as L3. The placard 208 can be located between the boundary line designated as L4 and an abbreviated line 306 designated by L5.

Based on the scan area 204 of FIG. 2, it can be determined that lines L1, L2, and L4 are the boundary lines 212, while line L3 is shorter and can be identified as the MC divider line 214. By way of an example, the abbreviated line 306 designated as L5 is shortened due the angle of the lens and position of the optical sensor 110, but the detection of the placard 208 can be used to determine that L5 is actually the boundary line 212.

It has been discovered that the parking lot scan 201 can be resolved to identify the boundary lines 212, the placard 208, and the MC divider line 214 within the scan area 204. By identifying the world coordinates of the boundary lines 212 and applying the line rule 120 based on those coordinates, the parking space 202 of FIG. 2 can be identified. This is an essential step for autonomous vehicles and parking assisted vehicles.

Figure 4:
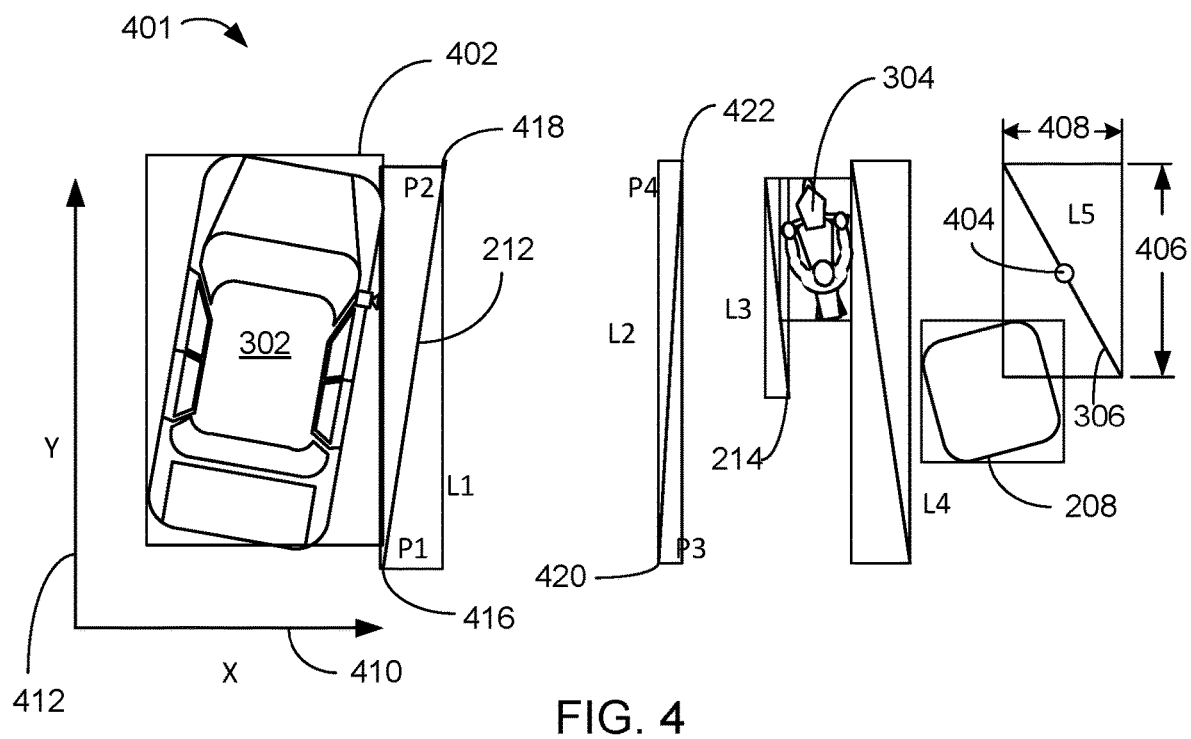
FIG. 4 is an exemplary object detection diagram of the parking lot scan of FIG. 2 as processed by the navigation system.

Referring now to FIG. 4, therein is shown an example of an object detection diagram 401 of the parking lot scan 201 of FIG. 2 as processed by the navigation system 100 of FIG. 1. The example of the object detection diagram 401 depicts a bounding box 402 surrounding each of the objects in the scan area 204 of FIG. 2, including the parked vehicle 302, the motorcycle 304, the placard 208, the boundary lines 212 designated L1, L2, and L4, The MC divider line 214 designated as L3, and the abbreviated line 306 designated as L5.

The bounding box 402 can be defined by a box center 404, a box length 406, and a box width 408. Each of the objects detected in the scan area 204 can be surrounded by the bounding box 402. It is understood that the scan area 204 is assumed to be level and having a constant value in the vertical (Z) plane. The box center 404 in defined by an X coordinate 410 and a Y coordinate 412. The box length 406 is defined as the measure of the bounding box 402 as measured through the Y coordinate 412 with the X coordinate 410 held at a constant value. The box width 408 is defines as the measure of the bounding box 402 as measured through the X coordinate 410 with the Y coordinate 412 held at a constant value.

The objects detected in the scan area 204 can be reduced to leave specific lines by removing the detected objects, including the parked vehicle 302 and the motorcycle 304. If the first device 102 is configured as a handicapped accessible vehicle, the placard 208 can indicate the availability of the handicapped parking space 206 of FIG. 2. If the first device 102 is not configured as the handicapped accessible vehicle, the line rule 120 of FIG. 1 can disregards the placard 208 and the abbreviated line 306 designated as L5. Based on the line rule 120, the boundary lines 212 designated as L2 and L4 are disqualified as being the parking space 202 because the MC divider line 214 designated as L3 falls between them. The remaining boundary lines designated as L1 and L2 can be further analyzed to determine if they are the parking space 202.

The boundary line 212 designated as L1 and L2 can be defined by their endpoints. The endpoint P1 416 and the endpoint P2 418 can define the boundary line 212 designated as L1. The endpoint P3 420 and the endpoint P4 422 can define the boundary line 212 designated as L2. It is understood that the endpoint P1 416, the endpoint P2 418, the endpoint P3 420, and the endpoint P4 422, are each defined by the X coordinate 410 and the Y coordinate 412 for each of the endpoints.

The boundary line 212 designated as L1 can be plotted in the overhead depiction 109 of FIG. 1 by a geometric conversion of the endpoint P1 416 and the endpoint P2 418 in real world coordinates based on the position of the optical sensor 110 as provided by the first device 102 and an extrinsic calibration of the optical sensor 110. The extrinsic calibration information of the optical sensor 110 and can include lens distortion, lens rotation, and distance translation due to lens curvature.

The boundary line 212 designated as L2 can be plotted in the overhead depiction 109 by a geometric conversion of the endpoint P3 420 and the endpoint P4 422 in real world coordinates based on the position of the optical sensor 110 as provided by the first device 102 and the extrinsic calibration of the optical sensor 110.

The determination of the parking space 202 of FIG. 2 can be performed during the generation of the overhead depiction 109. This is possible because the geometry of the first device 102 is known and the geometry of the identified space can be determined from the overhead depiction 109.

It has been discovered that the determination of the bounding box 402 and the endpoints 416 can provide sufficient information to plot the parking space 202 in the real world coordinates by using a geometric conversion. The accurate depiction of the relative position of the parking space 202 relative to the first device 102 simplifies the generation of maneuvering instructions required to move the first device 102 into the parking space 202.

Figure 5:
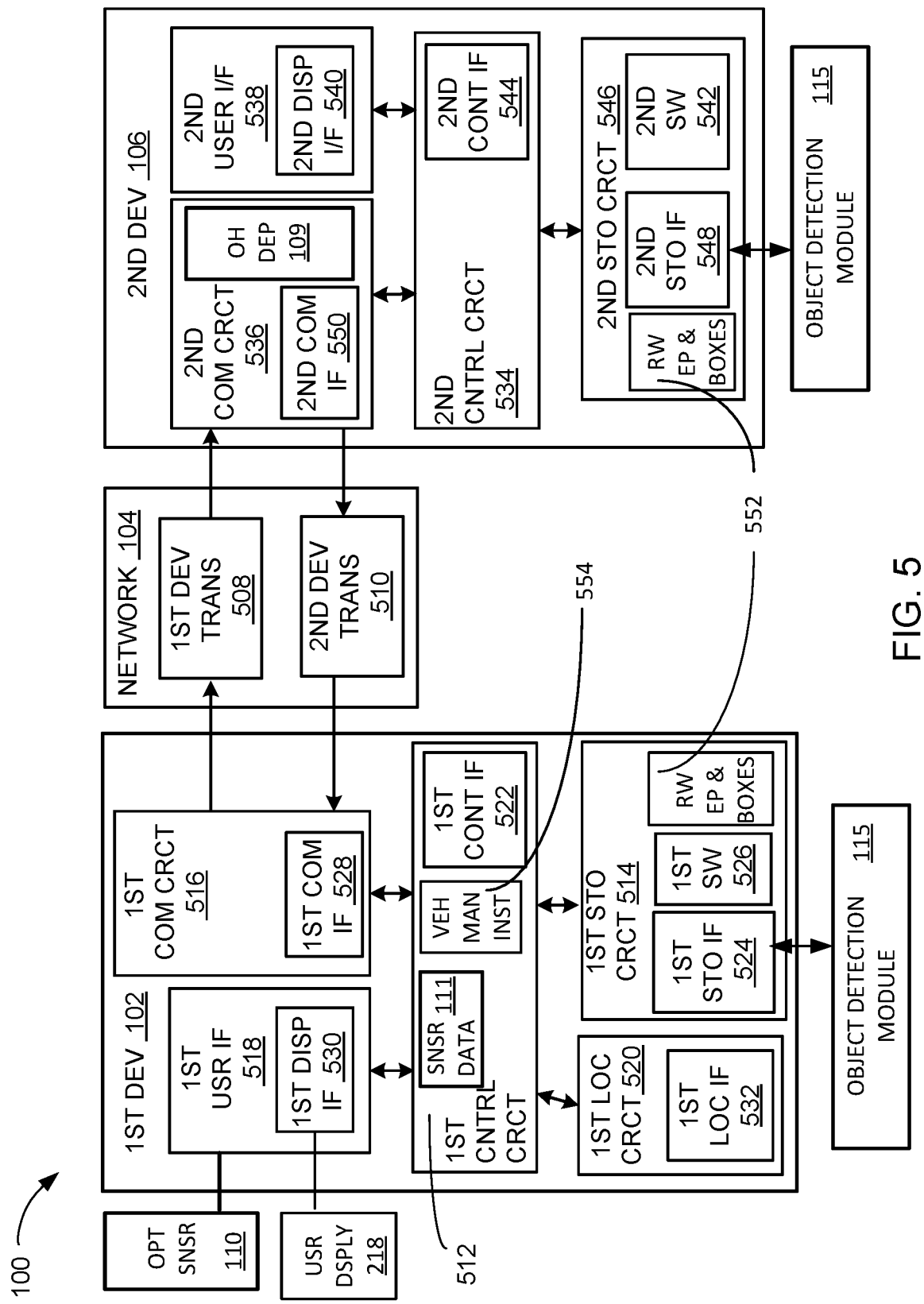
FIG. 5 is an exemplary block diagram of the navigation system.

Referring now to FIG. 5, therein is shown an exemplary block diagram of the navigation system 100 of FIG. 1. The navigation system 100 can include the first device 102 of FIG. 1, the network 104 of FIG. 1, and the second device 106 of FIG. 1. The first device 102 can send information in a first device transmission 508 over the network 104 to the second device 106. The second device 106 can send information in a second device transmission 510 over the network 104 to the first device 102.

For illustrative purposes, the navigation system 100 is shown with the first device 102 as a client device, although it is understood that the navigation system 100 can include the first device 102 as a different type of device. For example, the first device 102 can be a server containing the first display interface 530 coupled to the user display 218.

Also, for illustrative purposes, the navigation system 100 is shown with the second device 106 as a server, although it is understood that the navigation system 100 can include the second device 106 as a different type of device. For example, the second device 106 can be a client device. By way of an example, the navigation system 100 can be implemented entirely on the first device 102. The second device 106 can provide training and enhancement of the multilayer neural network 116 of FIG. 1.

Also, for illustrative purposes, the navigation system 100 is shown with interaction between the first device 102 and the second device 106. However, it is understood that the first device 102 can be a part of or the entirety of the autonomous vehicle, the smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first user interface 518, and a first location circuit 520. The first control circuit 512 can include a first control interface 522. The first control circuit 512 can execute a first software 526 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the sensor data local storage 108. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102. The first storage interface 524 can receive input from and source data to the object detection module 115.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106, an attachment, such as a peripheral device or a desktop computer, and the network 104.

The first communication circuit 516 can also function as a communication hub allowing the first device 102 to function as part of the network 104 and not limited to be an endpoint or terminal circuit to the network 104. The first communication circuit 516 can include active and passive components, such as microelectronics or an antenna, for interaction with the network 104.

The first communication circuit 516 can include a first communication interface 528 of FIG. 5. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first user interface 518 allows the user 112 of FIG. 1 to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, the optical sensor 110, or any combination thereof to provide data and communication inputs. By way of an example, the optical sensor 110 can connect to the first user interface 518 through a wired or wireless connection. The first user interface 518 can pass the input from the optical sensor 110 to the first control circuit 512 for processing and storage. During training of the object detection module 115, the first communication interface 528 can transfer the input from the optical sensors 110, the location of the optical sensors 110, and the extrinsic parameters of the optical sensor 110 to the second device 106 to enhance the accuracy and reliability of the multilayer neural network 116 of FIG. 1 and the line rules module 120 of FIG. 1.

The first user interface 518 can include a first display interface 530. The first display interface 530 can include an output device. The first display interface 530 can include the user display 218, a projector, a video screen, a speaker, or any combination thereof.

The first control circuit 512 can operate the first user interface 518 to display information generated by the navigation system 100. The first control circuit 512 can also execute the first software 526 for the other functions of the navigation system 100, including receiving location information from the first location circuit 520. The first control circuit 512 can further execute the first software 526 for interaction with the network 104 via the first communication circuit 516.

The first control circuit 512 can operate the first user interface 518 to collect data from the optical sensors 110. The first control circuit 512 can also receive location information from the first location circuit 520. While operating as the parking space identification mechanism, the first control circuit 512 can compile the sensor data packet 111, including scan of the scan area 204 of FIG. 2, the real world coordinates 203 of the optical sensor 110, and the extrinsic parameters of the optical sensor 110. The first control circuit 512 can operate the object detection module 115 in order to deliver the overhead view 109 for display on the user display 218 and generate the control guidance instructions to autonomously park or assist in parking the first device 102.

The first location circuit 520 can generate location information in real-world coordinates, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver.

The first location circuit 520 can include a first location interface 532. The first location interface 532 can be used for communication between the first location circuit 520 and other functional units or circuits in the first device 102, including the optical sensor 110.

The first location interface 532 can receive information from the other functional units/circuits or from external sources, or can transmit information to the other functional units/circuits or to external destinations. The external sources and the external destinations refer to sources and destinations external to the first device 102.

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

During the training process, the second control circuit 534 can receive the sensor data packet 111 through the second communication circuit 536. The second control circuit can verify the content of the sensor data packet 111 does indeed represent the scan area 204 of FIG. 2 that was identified by the location of the first device 102, by examining the scan of the scan area 204, the real world coordinates 203 of the optical sensor 110, and the extrinsic parameters of the optical sensor 110. Once the sensor data packet 111 has been verified, the second control circuit 534 can transfer the sensor data packet 111 through the second storage circuit 546 to the object detection module 115 for processing.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514. During the training process the second storage circuit 546 can receive the overhead depiction 109 of the scan area 204 identifying the parking space 202. The second storage circuit 546 can pass the overhead depiction 109 to incorporate maneuvering instructions for accessing the parking space 202 by the first device 102. The overhead depiction 109 can then be passed through the second communication circuit 536 for transmission to the first device 102.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544. The second storage circuit 546 can receive real world endpoints and boxes 552 from the object detection module 115.

The second control circuit 534 can generate vehicle maneuvering instructions 554 and the overhead depiction 109 from the real world endpoints and boxes 552. During the training process the second control circuit 534 can merge the vehicle maneuvering instructions 554 into the overhead depiction 109 for transmission to the first device 102. By way of an example, the real world endpoints and boxes 552 can be the geometric conversion of the endpoint P1 416 of FIG. 4, the endpoint P2 418 of FIG. 4, and the bounding box 402 of FIG. 4 in real world coordinates based on the GPS position of the optical sensor 110 as provided by the first device 102 and an extrinsic calibration of the optical sensor 110.

The second communication circuit 536 can enable external communication to and from the second device 106. For example, the second communication circuit 536 can permit the second device 106 to communicate with the first device 102 over the network 104. By way of an example, the second device 106 can provide the overhead depiction 109 to the first device 102 in response to receiving the sensor data packet 111.

The second communication circuit 536 can also function as a communication hub allowing the second device 106 to function as part of the network 104 and not limited to be an endpoint or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

During the training process the first communication circuit 516 can couple with the network 104 to send the sensor data packet 111 of FIG. 1 to the second device 106 in the first device transmission 508. The second device 106 can receive information in the second communication circuit 536 from the first device transmission 508 of the network 104.

The second communication circuit 536 can couple with the network 104 to send information to the first device 102, including the overhead depiction 109 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

By way of a further example, the first device 102 can be the autonomous vehicle. The first user interface 518 can receive input from the optical sensor 110 of FIG. 1, for compiling the sensor data packet 111 of FIG. 1. The sensor data packet 111 can be generated by the first control circuit 512 from the optical sensor and the first location circuit 520. The sensor data packet 111 can be sent through the first communication circuit 516 and the network 104 to the second device 106 for processing by the second control circuit 534 and the object detection module 115.

It has been discovered that the second device 106 can receive the sensor data packet 111 from the first device 102 that requires identification of the parking space 202 of FIG. 2. The second control circuit 534 can verify the sensor data packet 111 and pass the information to the object detection module 115 for analysis. When the object detection module 115 has analyzed the data and assembled the overhead depiction 109, the second control unit can incorporate maneuvering instructions for the first device 102 to access the parking space 202 or continue searching for an appropriate one of the parking space 202. The overhead depiction 109 can then be passed to the second communication circuit 536 for transfer to the first device 102. The speed of the conversion is essential to the safe operation of the first device 102 while in parking assist or autonomous driving mode.

Figure 6:
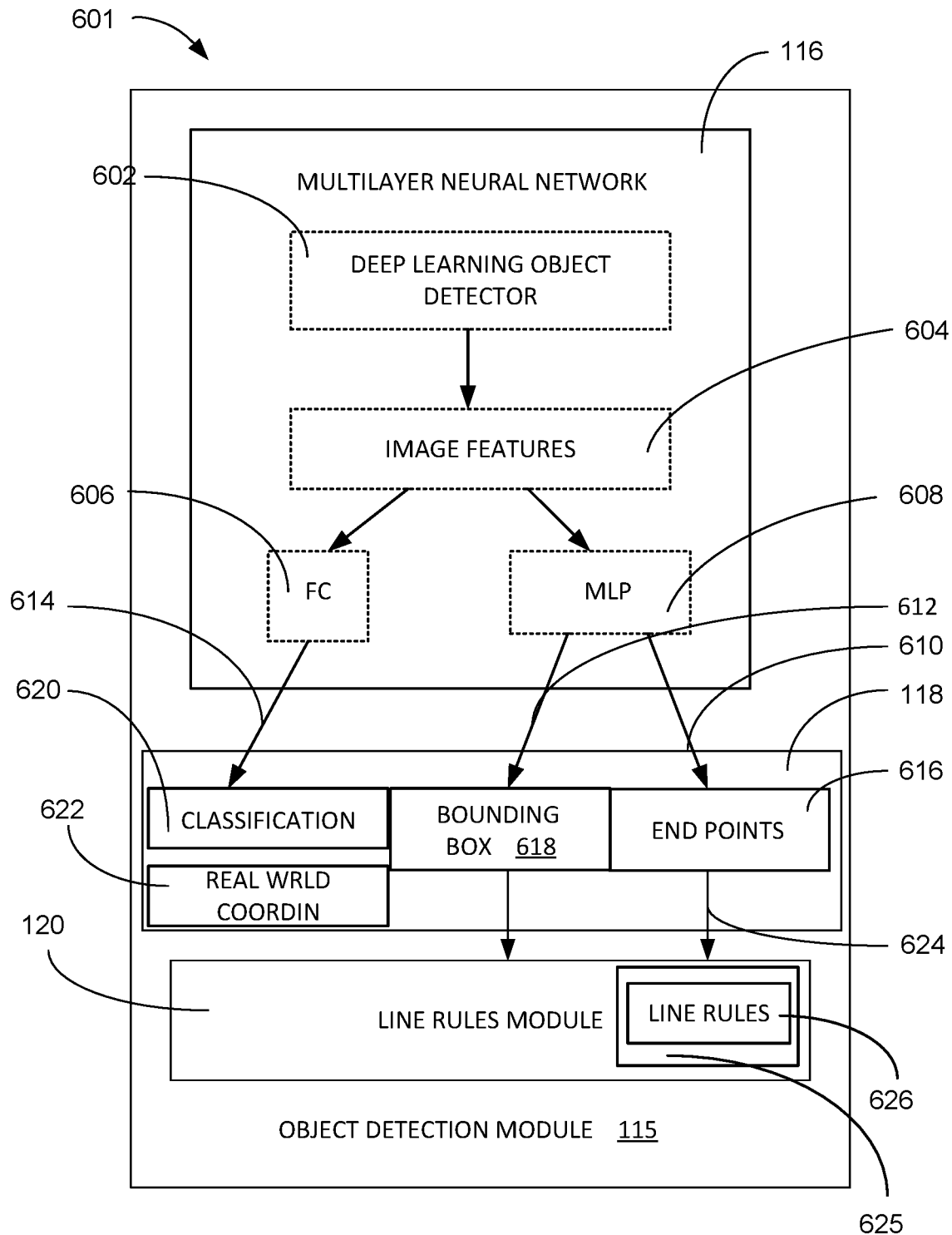
FIG. 6 is shown an exemplary block diagram of the object detection module of FIG. 1.

Referring now to FIG. 6, therein is shown an exemplary block diagram 601 of the object detection module 115 of FIG. 1. The exemplary block diagram 601 of the object detection module 115 can include the multilayer neural network 116, the endpoints and lines module 118, and the line rules module 120. It is understood that the object detection module 115 and its sub-components can be software executed by the second control circuit 534, the first control circuit 512, or a combination thereof. It is further understood that the object detection module 115 and its sub-components can have specific hardware assist logic where necessary to speed-up the object identification process.

The multilayer neural network 116 can include a deep learning object detector 602, such as FAST Regional-based Convolutional Neural Network (Fast R-CNN), You Only Look Once (YOLO), Single Shot Detector (SSD), or the like. The deep learning object detector 602 can receive the photo from the sensor data packet 111 of FIG. 1 and process the data from the scan area 204 of FIG. 2. The deep learning object detector 602 can be coupled to an image features module 604.

The image features module 604 can process the output of the deep learning object detector 602 to identify the objects detected from the initial processing. By focusing on the low probability objects a more robust determination can be made. The image features module 604 can further process the objects detected with low probability. This process can provide the highest chance of identifying all of the objects in the scan area 204.

The output of the image features module 604 can be further processed by a fully connected module (FC) 606, which can define the labeling or classification of objects in the scan area 204, By way of an example, the fully connected module can identify the parked vehicle 302, the motorcycle 304, the placard 208, the boundary lines 212 designated as L1, L2, L4, the motorcycle divider line 214, and the abbreviated line 306. The labeling of the identified objects can simplify the later processing.

The output of the image features module 604 can also be processed by a multilayer perception module (MLP) 608. The multilayer perception module (MLP) 608 can be trained by the second control circuit 534 of FIG. 5 to more effectively recognize the boundary lines 212 designated as L1, L2, L4, the motorcycle divider line 214, and the abbreviated line 306. The training process performed by the second control circuit can involve adjusting the weighting functions in the multilayer perception module (MLP) 608. The multilayer perception module (MLP) 608 can be defined as a neural network tasked with identifying the endpoints and lines in the scan area 204. The output of the multilayer perception module (MLP) 608 can be the bounding box 402 surrounding each of the boundary line 212, the motorcycle divider line 214, and the abbreviated line 306. The multilayer perception module (MLP) 608 can also output endpoints 610 for each of the identified lines.

The endpoints and lines module 118 can receive the endpoints 610, boxes 612, and classification 614 for each of the lines detected in the scan area 204. The endpoints 610 that are paired with their box 612 can be manipulated by the endpoints module 616 in order to convert the endpoints 610 by a real world coordinates module 622. The real world coordinates module 622 can be utilize the location information transferred from the first device 102 and known extrinsic values provided for the optical sensor 110 to determine real world endpoints 624. The real world endpoints 624 can be defined as the GPS location of each of the endpoints 610.

The line rules module 120 can provide a rules memory 625 for storing a set of reloadable rules for determining the geometry of the parking space 202 from the collection of lines derived from the scan area 204. The rules memory 625 can be a volatile memory or a non-volatile memory capable of being configured by the second control circuit 534 as the line rules are changed to detect a different type of the parking space 202. The line rules module 120 can determine whether the geometry of the real world endpoints 624 can form the desired parking space 202.

By way of an example the line rules for determining the parking space 202 can include:
1) the real world endpoints 624 should form at least two parallel lines of substantially the same length.
2) the length of lines should be in a reasonable range, for example 7 to 17 feet in length for motorcycles or standard vehicles.
3) there are no intervening lines or placards within the area formed by the selected lines.
4) parallel line separation must be in the range of 35-50% wider than the first device 102.

It is understood that other rules can provide detection of the motorcycle parking space 210 of FIG. 2, the handicapped parking space 206, a truck parking space (not shown), or a bus parking space (not shown). It is further understood that the real world endpoints 624 can provide the overhead depiction of the parking space 202 through a geometric projection of the boundary lines 212. The second control circuit 534 retrieve the real world endpoints 624 in order to generate the overhead depiction 109 and the maneuvering instructions for the first device 102 to access the parking space 202 safely and reliably.

It has been discovered that the detection of the real world endpoints 624 can provide a stable rendering in various lighting conditions and for various shapes or colors of parking lot lines. The features of the boundary lines 212 of FIG. 2 provide good definition and can provide a mechanism for training the modern convolution neural networks for object detection without regard to the color of the boundary lines 212 or the lighting in the scan area 204. Examples of faded lines, dashed lines, newly painted lines, reflective lines, and presumed lines can be submitted to the modern convolution neural networks for training. The presumed lines can represent an appropriate spacing in a gravel or dirt parking lot, based on providing a single reference point representing an endpoint of the boundary lines 212.

Figure 7:
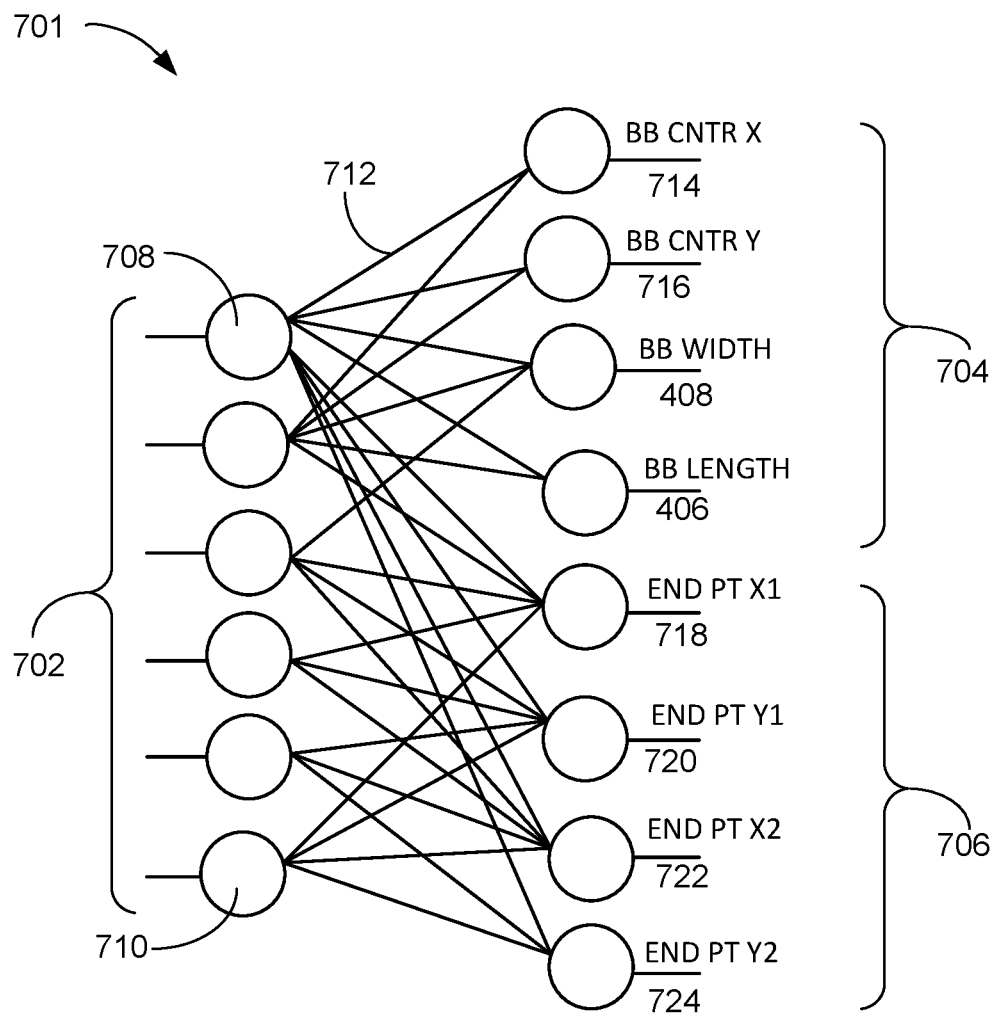
FIG. 7 is an exemplary implementation of the multilayer perception module (MLP) of FIG. 6 in an embodiment.

Referring now to FIG. 7, therein is shown an exemplary implementation of a multilayer neural network 701 in an embodiment. The exemplary implementation of the multilayer neural network 701 includes input neurons 702, output bounding box neurons 704, and output endpoint neurons 706. By way of an example, the multilayer neural network 701 can be trained to identify lines, including the boundary lines 212 of FIG. 2, the motorcycle divider line 214 of FIG. 2, the abbreviated line 306, or a combination thereof. It is understood that this for an example only and other versions of the multilayer neural network 701 can be trained to identify other objects, including the parked vehicle 302 of FIG. 3, the motorcycle 304 of FIG. 3, the placard 208 of FIG. 2, people, or other objects.

The multilayer neural network 701 can exemplify the multilayer perception module (MLP) 608 of FIG. 6, though the function of this example is simplified in order to describe a portion of the function. The input neurons 702 can include input neuron 10 708 through input neuron In 710, where n is a positive integer. By way of an example FIG. 7 depicts six of the input neurons 702, but any number can be implemented. The input neuron 10 708 can provide an analysis function for processing portions of the scan area 204 of FIG. 2 provided in the sensor data packet 111 of FIG. 1.

The input neurons 702 can each support a different function in the analysis of the sensor data packet 111. Each of the input neurons 702 can be interconnected with multiple of the output bounding box neurons 704 and the output endpoint neurons 706. The interconnects are weighting functions 712 that control the amount of influence the input neurons 702 have on the output bounding box neurons 704, the output endpoint neurons 706, or the combination thereof. The second control circuit 534 of FIG. 5 can train the multilayer neural network 701 by adjusting weighting functions 712 to identify the endpoints 610 of FIG. 6 of a line and the bounding box 402 of FIG. 4 associated with them. The multilayer neural network 701 can identify the lines in the sensor data packet 111, including the boundary lines 212 designated as L1, L2, L4, the motorcycle divider line 214, and the abbreviated line 306.

By way of an example, the input neuron 10 708 can be interconnected to each of the output bounding box neurons 704 and the output endpoint neurons 706, while each of the weighting functions 712 can be of a different value. Conversely, the input neuron In 710 can be connected to the output endpoint neurons 706 and have no influence on the output bounding box neurons 704.

Continuing with the example, the output bounding box neurons 704 can include a bounding box center X 714, a bounding box center Y 716, the bounding box width 408, and the bounding box length 406. When the input neurons 702 identify a line, such as the boundary line 212 of FIG. 2, the output bounding box neurons 704 and the output endpoint neurons 706 will become valid and the bounding box 402 can be defined around the boundary line 212 with the endpoint P1 416 of FIG. 4, composed of the values of endpoint X1 718 and endpoint Y1 720, and endpoint P2, composed of endpoint X2 722 and endpoint Y2 724.

The values of the output bounding box neurons 704 and the output endpoint neurons 706 can be passed to the endpoints and lines module 118 of FIG. 1 for further processing. By passing each of the sets of endpoints and associated bounding boxes to the endpoints and lines module 118, all of the lines detected in the sensor data packet 111 can be identified and processed.

It has been discovered that the multilayer neural network 701 can be trained to efficiently detect the lines presented in the sensor data packet 111. This allows the line rules module 120 to quickly identify the parking space 202 of FIG. 2. Since the speed and accuracy of the conversion is imperative to the second control circuit 534 providing the overhead depiction 109 including maneuvering instructions 554 of FIG. 5, the identification of just the endpoints 610 of FIG. 6 and the bounding box 612 of FIG. 6 are accurate regardless of line color or ambient lighting in the scan area 204.

Figure 8:
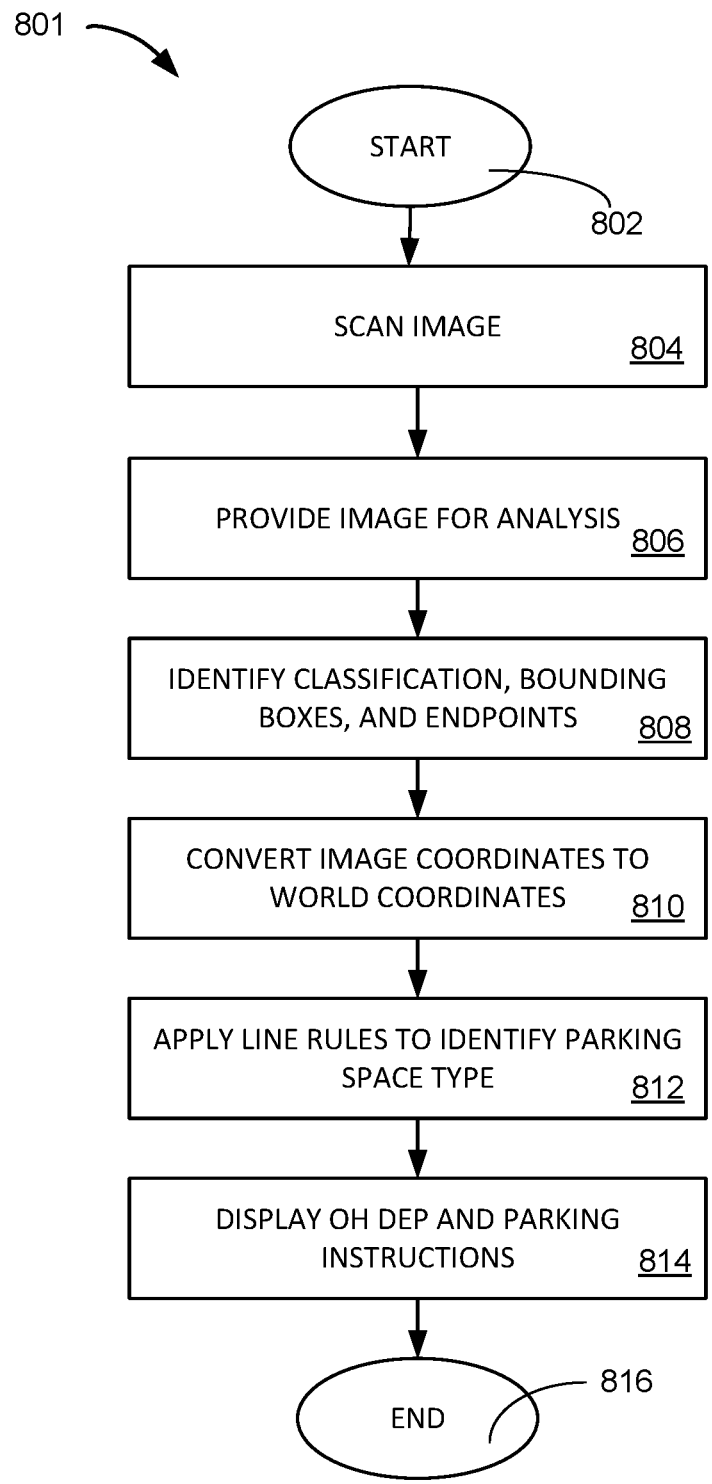
FIG. 8 is an exemplary operational flow chart of the navigation system of FIG. 1 in an embodiment of the present invention.

Referring now to FIG. 8, therein is shown an exemplary operational flow chart 801 of the navigation system 100 of FIG. 1 in an embodiment of the present invention. The exemplary operational flow chart 801 of the navigation system 100 depicts a start block 802 indicating that the first device 102 of FIG. 1 has accessed an area seeking the parking space 202 of FIG. 2. the flow proceeds to a scan image block 804 in which the optical sensor 110 of FIG. 1 of the first device 102 captures the scan area 204 of FIG. 2. The first control circuit 512 of FIG. 5 can identify the current global location by accessing the first location circuit 520 of FIG. 2 for incorporation in the sensor data packet 111 of FIG. 1. It is understood that the current global location can indicate the actual location of the optical sensor 110 of the first device 102. The first control circuit 512 can generate extrinsic parameters of the optical sensor 110 in order to facilitate the analysis of the sensor data packet 111.

The flow proceeds to a provide image of analysis block 806, in which the sensor data packet 111 is analyzed by the first device 102. It is understood that the second device 106 can have more data processing capability and speed than the first device 102, so for training purposes the processing of the sensor data packet 111 could be performed by the second device 106 and after the multilayer neural network 116 of FIG. 1 has been trained, the analysis can be performed by the first device 102.

The flow proceeds to an identify classification, bounding boxes and endpoints block 808. Here, the multilayer neural network 116 of FIG. 1 can analyze the image from the scan area 204 and identify objects of interest to the scan task. By way of an example, the scan task might be to identify the parking space 202, locate a motorcycle parking space 210, or locate a handicapped parking space 206. The multilayer neural network 116 can process the image taken from the scan area 204 to yield for example, boxes 612 of FIG. 6 and endpoints 610 of FIG. 6 for any lines that appear in the scan area 204. The intermediate data, such as the end point 416 of FIG. 4 identified as P1 and the endpoint 418 of FIG. 4 identifies as P2 and their associated one of the bounding box 402 of FIG. 4, can be stored in the second storage circuit 546 for future operations.

The flow then proceeds to a convert image coordinates to world coordinates block 810. In the convert image coordinates to world coordinates block 810 pictorial coordinates of the boxes 612 and the endpoints 610 are converted by the real world coordinates module 622 of FIG. 6 by a geometric process based on the extrinsic parameters of the optical sensor 110 and the real world coordinates 203 of FIG. 2 of the optical sensor 110. The real world endpoints 624 are converted based on the location information provided by the first device 102 and the extrinsic information of the optical sensor 110. The real world endpoints 624 can be stored in the second storage circuit 546 for subsequent operations.

The flow then proceeds to an apply line rules to identify parking space block 812. By way of an example the multilayer neural network 116 was explained to locate the boundary lines 212 of FIG. 2. Though it is understood the multilayer neural network 116 can be trained to identify other types of spaces or objects as well, including the motorcycle parking space 210 and the handicapped parking space 206. The line rules module 120 of FIG. 1 can identify parallel boundary lines 212 of substantially the same length. The line rules module 120 can further verify that there are no additional lines between the set of boundary lines 212, and the spacing between the boundary lines 212 is sufficient for the first device 102 to successfully access the parking space 202.

The flow can then proceed to a display overhead depiction and parking instructions block 814. The first control circuit 512 can assemble the overhead depiction 109 from real world endpoints 624 of the boundary lines 212 by a geometric calculation and generate a set of maneuvering instructions for the first device 102 to access the parking space 202. The first control circuit 512 can merge the overhead depiction 109 of the parking space 202 and the set of maneuvering instructions into the overhead depiction 109. The first control circuit 512 can send the overhead depiction 109 to the user interface 518 for presenting on the user display 218.

The flow proceeds to an end 816, in which the first device 102 can receive the overhead depiction 109, present it on the user display 218 of FIG. 2. It is understood that the user display 218 can show the scan data from the scan area 204 and the overhead depiction 109 can be presented as a highlighted overlay, or the overhead depiction 109 can be presented on the user display 218 by itself. The first device 102 can extract the maneuvering instructions from the overhead depiction 109 in order to enable the driver assisted or autonomous driving features of the first device 102 to then access the parking space 202.

Figure 9:
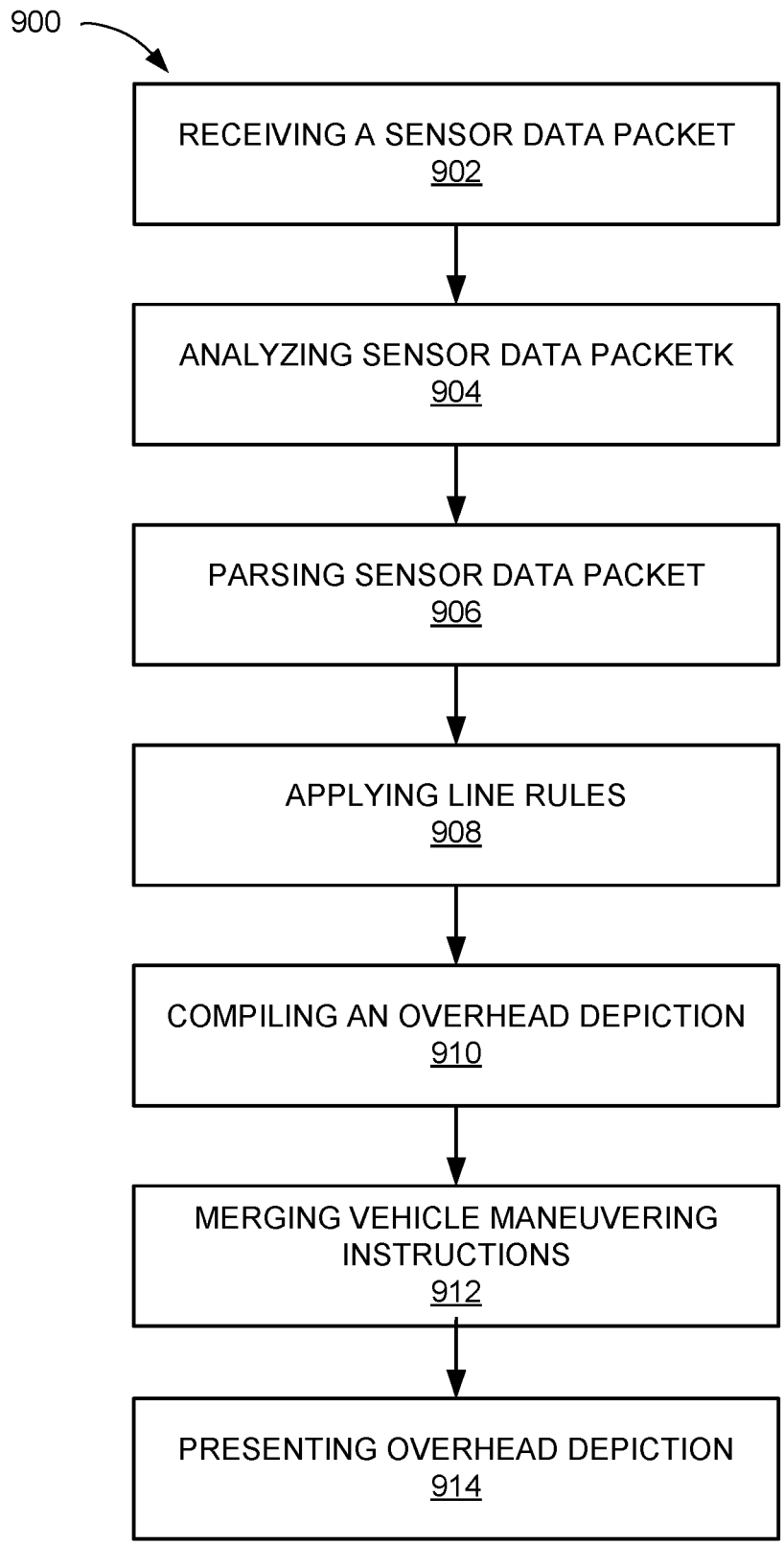
FIG. 9 is a flow chart of a method of operation of a navigation system in an embodiment of the present invention.

Referring now to FIG. 9, therein is shown a flow chart of a method 900 of operation of a navigation system 100 of FIG. 1 in an embodiment of the present invention. The method 900 includes: receiving a sensor data packet for a scan area in block 902; analyzing the sensor data packet submitted to a multilayer neural network already trained including storing the sensor data packet in a block 904; parsing the sensor data packet with the multilayer neural network to generate real world endpoints and a bounding box including identifying the real world coordinates a block 906; applying line rules, including identifying a parking space by the real world endpoints including storing the real world endpoints in the storage circuit in a block 908; compiling an overhead depiction including boundary lines of the parking space identified by the real world endpoints and the bounding box in the scan area in a block 910; merging vehicle maneuvering instructions into the overhead depiction for accessing the parking space in a block 912; and presenting the overhead depiction for displaying on a user display in a block 914.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a user interface configured to:
      receive a sensor data packet for a scan area;
   a control circuit, coupled to the user interface, configured to:
      analyze the sensor data packet submitted to a multilayer neural network already trained including storing the sensor data packet;
      parse the sensor data packet with the multilayer neural network to generate real world endpoints and a bounding box including identifying the real world coordinates;
      apply line rules, including identifying a parking space by the real world endpoints including storing the real world endpoints in a storage circuit;
      compile an overhead depiction including boundary lines of the parking space identified by the real world endpoints and the bounding box in the scan area;
      merge vehicle maneuvering instructions into the overhead depiction for accessing the parking space; and
      present the overhead depiction for displaying on a user display.

2. The system as claimed in claim 1 wherein the control circuit is configured to:
   update a rules memory in a line rules module when the line rules are changed; and
   detect a motorcycle parking space or a handicapped parking space based on updating the line rules.

3. The system as claimed in claim 1 wherein the control circuit is configured to load real world coordinates in an endpoints and lines module to calculate the real world endpoints.

4. The system as claimed in claim 1 wherein the control circuit is configured to verify the sensor data packet including a scan of the scan area, real world coordinates of an optical sensor, and extrinsic parameters of the optical sensor.

5. The system as claimed in claim 1 wherein the control circuit is configured to generate the real world endpoints and the bounding box includes the control circuit performing a geometric conversion based on the real world coordinates of an optical sensor, and extrinsic parameters of the optical sensor.

6. The system as claimed in claim 1 wherein the control circuit is configured to detect a handicapped parking space by identifying a placard between the boundary lines.

7. The system as claimed in claim 1 wherein the control circuit configured to present the overhead depiction for displaying on a user display includes a device accessing the parking space identified by the multilayer neural network.

8. The system as claimed in claim 1 further comprising a communication circuit, coupled to the control circuit, configured to send the sensor data packet and receive the overhead depiction through a network for refining the multilayer neural network.

9. A method of operation for a navigation system comprising:
receiving a sensor data packet for a scan area;
analyzing the sensor data packet submitted to a multilayer neural network already trained including storing the sensor data packet;
parsing the sensor data packet with the multilayer neural network to generate real world endpoints and a bounding box including identifying the real world coordinates;
applying line rules, including identifying a parking space by the real world endpoints including storing the real world endpoints in a storage circuit;
compiling an overhead depiction including boundary lines of the parking space identified by the real world endpoints and the bounding box in the scan area;
merging vehicle maneuvering instructions into the overhead depiction for accessing the parking space; and
presenting the overhead depiction for displaying on a user display.

10. The method as claimed in claim 9 further comprising:
updating a rules memory in a line rules module when the line rules are updated; and
detecting a motorcycle parking space or a handicapped parking space based on updating the line rules.

11. The method as claimed in claim 9 further comprising loading real world coordinates in an endpoints and lines module to calculate the real world endpoints.

12. The method as claimed in claim 9 further comprising verifying the sensor data packet including a scan of the scan area, real world coordinates of an optical sensor, and extrinsic parameters of the optical sensor.

13. The method as claimed in claim 9 further comprising generating the real world endpoints and the bounding box includes performing a geometric conversion based on the real world coordinates of an optical sensor, and extrinsic parameters of the optical sensor.

14. The method as claimed in claim 9 further comprising detecting a handicapped parking space by identifying a placard between the boundary lines.

15. A non-transitory computer readable medium including instructions for a navigation system comprising:
receiving a sensor data packet for a scan area;
analyzing the sensor data packet submitted to a multilayer neural network already trained including storing the sensor data packet;
parsing the sensor data packet with the multilayer neural network to generate real world endpoints and a bounding box including identifying the real world coordinates;
applying line rules, including identifying a parking space by the real world endpoints including storing the real world endpoints in a storage circuit;
compiling an overhead depiction including boundary lines of the parking space identified by the real world endpoints and the bounding box in the scan area;
merging vehicle maneuvering instructions into the overhead depiction for accessing the parking space; and
presenting the overhead depiction for displaying on a user display.

16. The non-transitory computer readable medium including the instructions as claimed in claim 15 further compromising:
updating a rules memory in a line rules module when the line rules are updated; and
detecting a motorcycle parking space or a handicapped parking space based on updating the line rules.

17. The non-transitory computer readable medium including the instructions as claimed in claim 15 further comprising loading real world coordinates in an endpoints and lines module to calculate the real world endpoints.

18. The non-transitory computer readable medium including the instructions as claimed in claim 15 further comprising verifying the sensor data packet including a scan of the scan area, real world coordinates of an optical sensor, and extrinsic parameters of the optical sensor.

19. The non-transitory computer readable medium including the instructions as claimed in claim 15 further comprising generating the real world endpoints and the bounding box includes performing a geometric conversion based on the real world coordinates of an optical sensor, and extrinsic parameters of the optical sensor.

20. The non-transitory computer readable medium including the instructions as claimed in claim 15 further comprising detecting a handicapped parking space by identifying a placard between the boundary lines.

* * * * *